(12) United States Patent
Galletta

(10) Patent No.: US 8,096,531 B2
(45) Date of Patent: Jan. 17, 2012

(54) METHOD AND APPARATUS FOR AERATION OF LIQUID MEDIUM IN A PIPE

(76) Inventor: Robert J. Galletta, Savannah, GA (US)

( * ) Notice: Subject to any disclaimer, the term of this patent is extended or adjusted under 35 U.S.C. 154(b) by 375 days.

(21) Appl. No.: 12/464,852

(22) Filed: May 12, 2009

(65) Prior Publication Data

US 2009/0272699 A1 Nov. 5, 2009

Related U.S. Application Data

(60) Continuation-in-part of application No. 12/187,905, filed on Aug. 7, 2008, now Pat. No. 7,531,097, which is a division of application No. 11/131,113, filed on May 17, 2005, now Pat. No. 7,427,058.

(51) Int. Cl.
*B01F 3/04* (2006.01)
(52) U.S. Cl. ............... 261/30; 261/91; 261/92
(58) Field of Classification Search ............ 261/28, 261/30, 34.1, 83, 84, 91, 92, DIG. 71
See application file for complete search history.

(56) References Cited

U.S. PATENT DOCUMENTS

| | | | |
|---|---|---|---|
| 345,408 A | 7/1886 | Birge | |
| 452,147 A | 5/1891 | Nuebling | |
| 901,465 A | 10/1908 | Pancoast | |
| 1,264,635 A * | 4/1918 | Graham | 210/331 |
| 1,681,711 A | 8/1928 | Taylor | |
| 2,033,412 A | 3/1936 | Chapman | |
| 2,639,129 A | 5/1953 | Rosset | |
| 2,678,810 A | 5/1954 | Chandler | |
| 3,322,410 A | 5/1967 | Ahlenius | |
| 3,493,216 A | 2/1970 | Johnson | |
| 3,653,641 A | 4/1972 | Eron | |
| 3,669,422 A | 6/1972 | Nogaj | |
| 3,709,664 A | 1/1973 | Krekeler et al. | |
| 3,871,581 A | 3/1975 | Dively | |
| 3,928,512 A | 12/1975 | Cherry | |
| 3,997,443 A | 12/1976 | Thissen | |
| 4,193,745 A * | 3/1980 | Hamilton et al. | 418/9 |
| 4,382,557 A | 5/1983 | Duerr | |
| 4,468,358 A | 8/1984 | Haegeman | |
| 4,493,557 A | 1/1985 | Nayak et al. | |
| 4,540,528 A | 9/1985 | Haegeman | |

(Continued)

FOREIGN PATENT DOCUMENTS

FR 2853310 4/2003

(Continued)

*Primary Examiner* — Charles Bushey
(74) *Attorney, Agent, or Firm* — Matthew L. Grell; Baiser & Grell IP Law

(57) ABSTRACT

An apparatus and method for mixing gas and liquid comprising a pipe having an enclosure positioned in-line with said pipe, wherein a sealed space is defined, at least one blower, said blower regulates the barometric pressure in said sealed space, wherein intermeshed rotating sets of discs operate on parallel shafts driven by variable speed drives, and strakes are radially mounted on the discs to carry liquid up into a mixing area and to carry air and liquid down into a mixing area resulting in a shear force that drives air into the oxygen depleted liquid. In the sealed space the barometric pressure is raised by a blower, in order to pop foam bubbles and allow for optimum mixing of air into the oxygen depleted liquid and to regulate the waterline within the sealed space, thereby preventing the escape of foam, noise and odorous gases into the local environment.

21 Claims, 8 Drawing Sheets

U.S. PATENT DOCUMENTS

| | | |
|---|---|---|
| 4,680,148 A | 7/1987 | Arbisi et al. |
| 4,838,704 A | 6/1989 | Carver |
| 4,913,854 A | 4/1990 | Miyahara |
| 5,021,154 A | 6/1991 | Haegeman |
| 5,116,501 A | 5/1992 | House |
| 5,196,148 A | 3/1993 | Nigrelli |
| 5,697,704 A | 12/1997 | Coyle |
| 5,948,326 A | 9/1999 | Pate |
| 6,158,722 A | 12/2000 | Glgas |
| 6,270,681 B1 | 8/2001 | Gray |
| 6,461,503 B1 * | 10/2002 | Blase et al. ............. 210/194 |
| 6,499,727 B1 | 12/2002 | Sylvester |
| 6,634,626 B2 | 10/2003 | Petrescu et al. |
| 6,832,753 B1 | 12/2004 | Huang |
| 7,029,584 B2 * | 4/2006 | Blase et al. ............. 210/331 |
| 7,427,058 B2 | 9/2008 | Galletta, Jr. |
| 7,531,097 B2 * | 5/2009 | Galletta, Jr. ............. 210/758 |
| 2004/0141851 A1 | 7/2004 | Hite |
| 2008/0290026 A1 | 11/2008 | Galletta, Jr. |

FOREIGN PATENT DOCUMENTS

| | | |
|---|---|---|
| GB | 1365294 | 8/1974 |
| JP | 9052098 | 2/1997 |
| JP | 2002219480 | 8/2002 |
| RU | 2129049 | 4/1999 |

* cited by examiner

METHOD AND APPARATUS FOR AERATION OF LIQUID MEDIUM IN A PIPE

CROSS-REFERENCE AND PRIORITY CLAIM TO RELATED APPLICATIONS

To the fullest extent permitted by law, the present Continuation-in-part patent application cross-references and claims priority to and the full benefit of divisional non-provisional patent application entitled "METHOD AND APPARATUS FOR AERATION OF LIQUID MEDIUM", filed on Aug. 7, 2008, having assigned Ser. No. 12/187,905 and having issued on May 12, 2009 under U.S. Pat. No. 7,531,097, incorporated herein by reference in its entirety, which claims priority to and the full benefit of non-provisional patent application entitled "METHOD AND APPARATUS FOR AERATION OF LIQUID MEDIUM", filed on May 17, 2005, having assigned Ser. No. 11/131,113 and having issued on Sep. 23, 2008 under U.S. Pat. No. 7,427,058, incorporated herein by reference in its entirety.

TECHNICAL FIELD

This invention relates to an apparatus and method for mixing gas, such as air, with liquid, and more particularly the invention relates to aeration of wastewater, sewage and industrial waste including any body of water or liquid.

BACKGROUND OF THE INVENTION

Wastewater from both municipal sewage systems and from industrial waste product exhausting systems is usually collected in large ponds, ditches, or basins that are referred to as wastewater ponds. Such ponds may be a few to several feet deep and may cover quite a number of acres of surface area. The wastewater usually includes large amounts of organic and inorganic waste material that, if left untreated, creates severe odors and can generates toxic products.

Moreover, EPA has published dissolved oxygen (DO) criteria for fresh water, saltwater, and discharges into the same bodies of water to protect organisms and their uses from the adverse effects of low DO conditions. The Agency developed these criteria because hypoxia (low dissolved oxygen) is a significant problem for lakes, streams, rivers, and coastal waters that receive a lot of runoff that contain nutrients (for example, nitrogen and phosphorous and other oxygen-demanding biological wastes). Excessive nutrients in aquatic systems stimulate algal growth, which in turn uses up the oxygen needed to maintain healthy fish, shellfish, and other aquatic life populations.

EPA's Environmental Monitoring and Assessment Program (EMAP) for lakes, streams, rivers, and coastal waters has shown areas exposed to some dissolved oxygen concentrations of less than 5 mg/L. Long periods of DO below 5 mg/L can harm larval life stages for many fish, shellfish, and other aquatic life populations.

The EPA's dissolved oxygen criteria apply to both continuous and cyclic low DO conditions. If the DO conditions are always above the chronic criterion for growth (4.8 mg/L), the aquatic life at that location should not be harmed. If the DO conditions at a site are below the juvenile/adult survival criterion (2.3 mg/L), there is not enough DO to protect aquatic life.

Under the Clean Water Act (CWA), states, territories, and tribes must adopt water quality criteria to protect designated uses. The EPA has promulgated regulations to implement this requirement including levels of DO (see 40 CFR 131).

The most common method of wastewater treatment uses an activated sludge process. This process involves three major steps. The primary treatment stage consists of a simple separation between dense sludge, which is sent to an incinerator or land fill, and the remaining effluent liquid sludge which then undergoes secondary treatment. Secondary treatment is where the biochemical consumption of organic material takes place. The microorganisms present in the liquid sludge feast on the biomass in the wastewater pond. Extensive aeration is needed for the bacteria to consume the organic wastes.

The third phase of treatment can be simple or extensive depending upon the extent of pollution and the requirements for water purity. Its purpose is to remove inorganic pollutants as well as any organic mass not removed by the primary and secondary stages. Lastly, the treated water is discharged back into the environment. This discharge must meet federal, state, county and city government standards for discharged water, such as minimum dissolved oxygen levels deemed necessary to accommodate marine life, before such wastewater can be discharged into a river or stream.

The activated sludge process is a biochemical process in which aerobic bacteria consume the organic pollutants in wastewater. Because the bacteria are aerobic, their efficiency of consumption is very dependent upon the amount of available oxygen dissolved in the liquid sludge. In the wastewater treatment process, aeration introduces air into a liquid, providing an aerobic environment for microbial degradation of organic matter. The purpose of aeration is two-fold: to supply the required oxygen to the metabolizing microorganisms and to provide mixing so that the microorganisms come into intimate contact with the dissolved and suspended organic matter.

Various aeration approaches have been used; the two most common aeration systems are subsurface and mechanical. In subsurface aeration systems, air or oxygen is pumped below the surface to a diffuser or other device submerged in the wastewater. Fine pore diffusion is a subsurface form of aeration in which air is introduced in the form of very small bubbles into the wastewater pond. One type of an oxygen diffuser for wastewater treatment process requires constant movement of the diffuser to different levels and positions within the wastewater pond and performs minimal mixing of the wastewater and microorganisms. In addition, un-reacted air or oxygen bubbles remaining that make their way to the surface. If oxygen is the source, then the oxygen that makes it to the surface of the wastewater pond is wasted as it vents to the air above the pond.

Mechanical aeration and mixing systems take on various forms, such as downdraft pumps, which force surface water to the bottom, updraft pumps, which produce a small fountain, and paddle wheels, which increase the surface area of the water. In addition, all such devices mix wastewater by moving large amounts of heavy water or hurling it into the air resulting in high energy consumption for these devices. Some such devices generate large amounts of odor and foam while agitating the wastewater and consume large amounts of electrical power resulting in high electricity cost for operation.

Therefore, it is readily apparent that there is a need for an economical apparatus and method for aeration of wastewater, sewage and industrial waste, and more particularly, a process for efficiently adding dissolved oxygen into wastewater, sewage and industrial waste while minimizing odor, foam and energy consumption.

BRIEF SUMMARY OF THE INVENTION

Briefly described, in the preferred embodiment, the present invention overcomes the above-mentioned disadvantages and meets the recognized need for such a device by providing a method and apparatus for mixing gas, such as air, with liquid, such as wastewater, sewage and industrial waste in a wastewater pond.

According to its major aspects and broadly stated, the present invention in its preferred form is a floating pressurized dome aerator device and process for adding dissolved oxygen into wastewater, sewage and industrial waste.

More specifically, the preferred aerator device present invention has two or more partially submerged interleaved sets of discs operating in rotational unison along parallel shafts driven by variable speed drives. One or more strakes with end caps are mounted on the discs in radial fashion, extending from the hub to the edge of the disc. The strakes on one disc bring the liquid up to the wastewater line and the strakes on the other disc bring the air down to the wastewater line and in close contact with each other in a mixing area just below the wastewater line. This force mixes the oxygen from the air into the oxygen-depleted water, thus increasing the dissolved oxygen content of the wastewater.

Still more specifically, an apparatus and method for mixing gas and liquid comprising a pipe having an enclosure positioned in-line with said pipe, wherein a sealed space is defined, at least one blower, said blower regulates the barometric pressure in said sealed space, wherein intermeshed rotating sets of discs operate on parallel shafts driven by variable speed drives, and strakes are radially mounted on the discs to carry liquid up into a mixing area and to carry air and liquid down into a mixing area resulting in a shear force that drives air into the oxygen depleted liquid. In the sealed space the barometric pressure is raised by a blower, in order to pop foam bubbles and allow for optimum mixing of air into the oxygen depleted liquid and to regulate the waterline within the sealed space, thereby preventing the escape of foam, noise and odorous gases into the local environment Accordingly, a feature and advantage of the present invention is its ability to create a shear force between the liquid on the leading edge of opposing strakes within the mixing area to efficiently mix the air and wastewater.

In addition, the strakes have bleed holes on their trailing face. The end caps force wastewater fluid eddy on the liquid side and flurries of bubbles of air on the gas side through the bleed holes of the trailing edge of the strake into the mixing area to efficiently mix the air and wastewater.

Accordingly, a feature and advantage of the present invention is its ability to sustain a larger number of aerobic dependent bacteria than traditional methods resulting in an increased biochemical consumption of organic material in the wastewater pond.

In use, the aerator device is placed on a floating platform to keep the aerator device at a set position relative to the water line. The floating apparatus is covered with an airtight cover or dome, wherein the barometric pressure is raised under the cover or dome by an air blower to create an atmosphere under the dome with an increased barometric pressure.

Another feature and advantage of the present invention is that the variable barometric pressure allows for optimum atmospheric dissolution under the cover or dome.

Another feature and advantage of the present invention is that the foam must travel back beneath the water line of the liquid to escape the floating apparatus resulting in further aeration of the liquid sludge.

Another feature and advantage of the present invention is that the liquid inlet is beneath the waterline creating a sealed environment.

Another feature and advantage of the present invention is that the liquid discharge is beneath the waterline creating a sealed environment.

Another feature and advantage of the present invention is its ability to minimize foam generated during use, wherein the raised barometric pressure in the dome serves the function of popping the bubbles created by the mechanical mixer.

Another feature and advantage of the present invention is that the cover or dome traps odorous gases preventing their escape into the local environment, resulting in an odor free operation.

Another feature and advantage of the present invention is that the cover or dome traps the noises generated by the mechanical agitation preventing their escape into the local environment and resulting in an essentially noise free operation.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1-9, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-9, the present invention in its preferred embodiment is a floating pressurized dome aerator device and process for adding dissolved oxygen into wastewater, sewage and or industrial waste. It is important to understand that the present invention is suitable for utilization in any liquid environment where an increase in dissolved air or gas into liquid medium is desired or beneficial; therefore, while the apparatus and method of the present invention is described conveniently with the preferred utilization in a wastewater pond, it is not limited to application or implementation in such wastewater pond. Furthermore, the present invention may be utilized in water such as but not limited to a golf course pond, water with aquatic plants, as well as water with fish and/or other marine life. The apparatus and method of the present invention is suitable for many applications where air or other gas is to be dissolved into a liquid medium, including but not limited to golf course ponds, oxygen depleted lakes, streams, and rivers as well as environmental and/or industrial processes.

Figure 1:
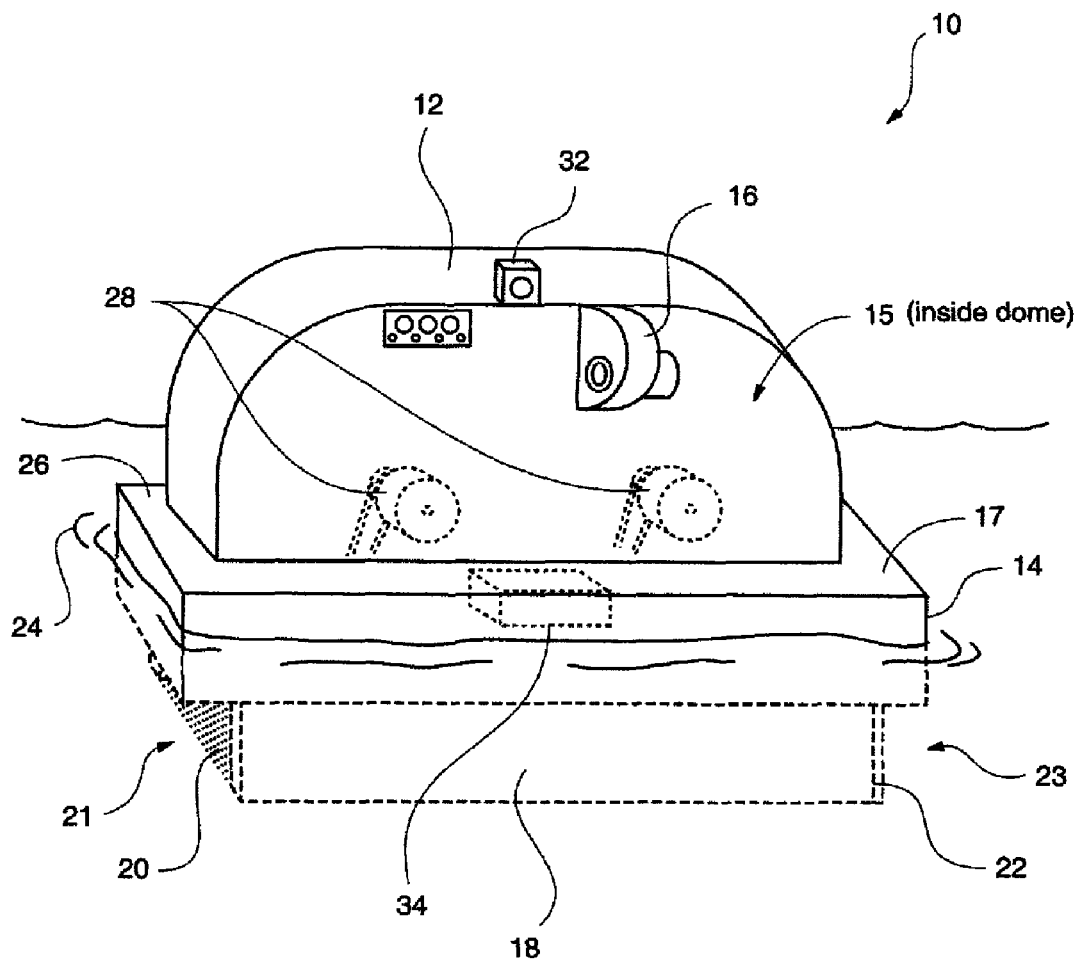
FIG. 1 is a cross-sectional illustration of the aeration apparatus according to the preferred embodiment of the present invention.

Referring now to FIG. 1, there is illustrated a preferred fully enclosed floating dome aerator device 10. Aerator device 10 is a mechanical gas dissolving apparatus operating in a controlled pressurized environment. Dome 12 is preferably supported by flotation device 14 proximate waterline 24 of a pond or wastewater, sewage, industrial waste pond or other selected liquid treatment reservoir. Dome 12 includes top portion 13 preferably positioned above the surface of the pond, so as to define a space or compartmental enclosure 15 for containing mechanical agitation of aerator device 10. Dome 12 is preferably constructed of an airtight and corrosion resistant material such as fiberglass or metal. It is recognized that other suitable materials could be utilized without departing from the intended scope of the present invention. That is, dome 12 may be constructed of any material capable of holding the area defined by space or compartmental enclosure 15 under the dome at a selected, preferably increased barometric pressure.

Compartmental enclosure defined by dome 12 creates a space above the waterline 22 that can collect foam and odor generated by aerator device 10. Foam generated by aerator device 10 is thus held in close proximity to aerator device 10 and must travel back beneath waterline 24 to escape, further enhancing the transfer of gas to the liquid. Odorous gases generated by the mechanical agitation of aerator device 10 are also trapped in dome 12 preventing their escape into the surrounding environment resulting in an essentially odor free operation. In addition, dome 12 acts as a sound barrier, trapping the noises generated by the mechanical agitation of aerator device 10, preventing their escape into the surrounding environment, and thereby resulting in an essentially noiseless operation.

Blower 16 is preferably any common industrial variable speed rotary type blower. Blower 16 can be of any standard design with air flow and pressure ratings capable of increasing the barometric pressure of the air under dome 12 to preferably between approximately 35-40 inches of mercury or 1-3 psi, however, greater barometric pressure can be utilized depending on the gas and liquid medium being mixed. Blower 16 is preferably rotary, but can be any fan, centrifugal, rotary or any other type of blower or air source. Blower 16 is preferably a single unit positioned proximate top portion 13; however, blower 16 can be in the form of a single or multiple blowers and can be located anywhere on aerator device 10 that permits air flow access to interior space 15 under dome 12. In the preferred operation, blower 16 increases the barometric pressure under dome 12 creating an ideal environment for the transfer of gas to the liquid under dome 12, wherein coincidentally surface area is increased via agitation and whirling of liquid by aerator device 10. In addition, the increase in barometric pressure under dome 12 assists with popping the foam bubbles, effectively reducing the foam generated by aerator device 10.

Blower 16 can preferably be used for facilitating fine adjustment of the position of the mechanical agitators of aerator device 10 relative to the pond level 24. That is, because barometric pressure inside dome 12 increases when blower 16 is in operation, this causes the liquid level under the dome 12 to be slightly lower than the static level of the pond.

Floatation device 14 is preferably a pontoon; however, flotation device 14 can be made of any material and define any shape capable of keeping aerator device 10 afloat. Floatation device 14 is preferably attached to a submerged or floating frame 46 (not shown) for support and positioning of dome 12, lower housing 18, and other components of aerator device 10. Flotation device 14 preferably includes a ballast (not shown) to allow for user-controlled or controller controlled height adjustment of aerator device 10 in relation to waterline 24. Such ballast allows the operator or controller to adjust the position of aerator device 10 relative to the static pond level, the specific gravity of the liquid, or the barometric pressure under dome 12. Flotation device 14 preferably includes maintenance deck 26 on top side 17 of flotation device 14, wherein maintenance deck 26 preferably extends outwardly along the circumference of dome 12.

Lower housing 18 preferably defines a partially submerged conduit having closed sides and bottom (not shown), thereby forming a submerged channel with an open top (not shown) and opposing open sides 21 and 23. Lower housing 18 is preferably attached to frame system 46 (not shown). Lower housing 18 is preferably made of a watertight and corrosion resistant material, however, lower housing 18 can be constructed of any material capable of directing the inflow and outflow of liquid through a designated passageway. Open end 21, referenced as the intake 21, preferably has intake screen 20 to prevent debris, marine life, and large particulates from entering aerator device 10. In addition, open end 23 referenced as the discharge 23, preferably has discharge screen 22 to prevent debris, marine life, and large particulates from entering aerator device 10. Such screening enables positioning of intake 21 and discharge 23 of lower housing 18 preferably submerged below the liquid line thereby creating a sealed environment and minimizing the noise, foam and odor escaping from aerator device 10.

Figure 2:
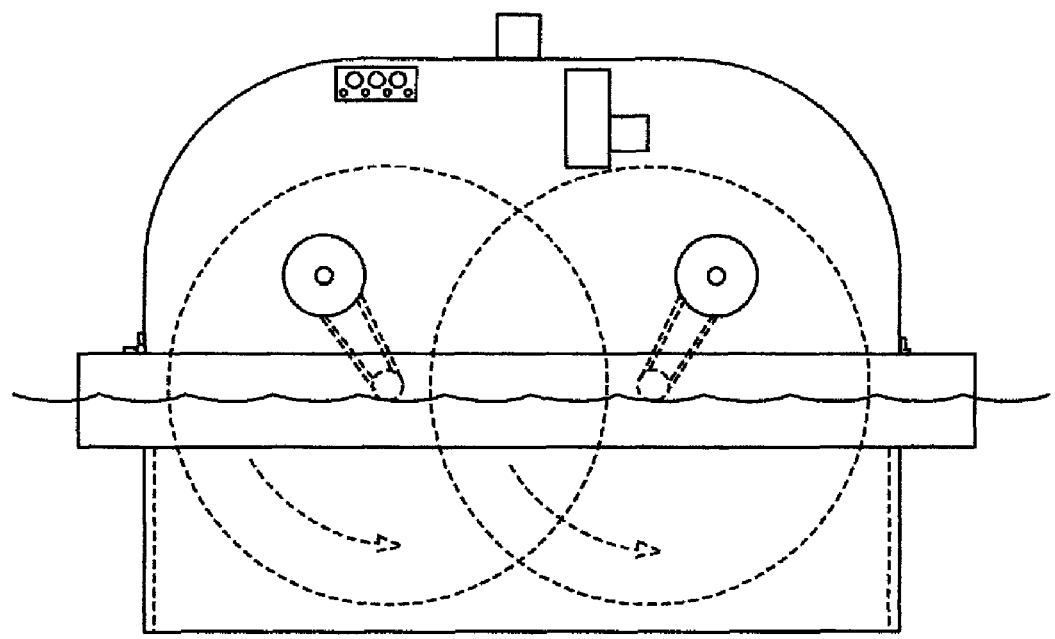
FIG. 2 is a front sectional view of the aeration apparatus of FIG. 1.

Dome 12 is preferably affixed to lower housing 18, preferably via a corrosion resistant hinge 48 and latch 50 assembly (shown in FIG. 2). Although hinge 48 and latch 50 are preferred, any appropriate affixing means of any standard mechanism can be utilized, including but not limited to nut and bolt, latch, lock, catch and/or clasp as long as the configuration is capable of holding dome 12 in contact with lower housing 18.

Drive 28 is preferably a variable speed AC or DC drive, including but not limited to any gear reduction, belt, chain, or shaft driven. Drive 28 can be any standard design with horse power, variable rotational speed, and directional ratings capable of rotating the mechanical agitation of aerator device 10. Drive 28 is preferably fixed to frame 46 of flotation device 14. Struts or brace members (not shown) preferably provide a generally rigid support for frame 46 and functions as a mounting plate for drive 28. Power sources capable of operating drive 28 and/or aerator device 10 include but are not limited to alternating current, direct current, compressed air and or solar power.

Controller 30 is preferably a multichanneldigital motor control. Controller 30 can be any standard drive controller that matches drive 28. Controller 30 may include other features such as a blower controller that monitors the pressure under dome 12 and regulates blower 16 to maintain a specified pressure under dome 12. Controller 30 may also include a scheduler to preset hourly, night and day, daily, weekly, monthly seasonal and/or other runtime schedules for aerator device 10. Controller 30 may also include inputs from environmental sensors (not shown), including but not limited to wastewater temperature, dissolved oxygen content of the wastewater, and/or air temperature wherein each sensor reading is preferably collected and available from inside and/or outside aerator device 10, in addition to a light sensor to determine and record whether the measurement is collected during night or day. With these inputs, controller 30 is able to maximize the efficiency of the transfer rate of gas to liquid by modifying the operation of aerator device 10 based on essentially real-time inputs from environmental sensors, wherein energy consumption is also minimized. Controller 30 is preferably positioned proximate top portion 13; however, controller 30 can be placed anywhere on aerator device 10 that is accessible by an operator from maintenance deck 26 on top side 17 of flotation device 14. Controller 30 can be remotely controlled by a wireless radio frequency, infrared signal, or any other suitable transmission and receive source, thereby enabling aerator device 10 to be programmed or operated from a remote location.

As illustrated in FIG. 1, aerator device 10 preferably has lifting eye 32 suitably fixed to frame 46 of flotation device 14. Lifting eye 32, together with frame 46 of flotation device 14, preferably enables aerator device 10 to be lifted in and out of a wastewater pond via a hoist or crane. Lifting eye 32 can be in the form of a single or multiple lifting eyes and can be located anywhere on aerator device 10 suitable for attachment to frame 46 of flotation device 14.

Referring now to FIG. 2, there is illustrated a front cross-sectional view of floating dome aerator device 10 with preferred placement of the internal mechanics of aerator device 10 shown. Two drives 42 and 44 are preferred and shown for aerator device 10, a leading drive 42 and a trailing drive 44. Leading drive 42 and trailing drive 44 preferably rotationally operate in the same direction and at the same speed; however, drives 42 and 44 are preferably capable of operating at different speeds. For example, trailing drive 44 could operate at 2× the speed of leading drive 42.

Both leading drive 42 and trailing drive 44 are preferably attached to frame 46. Frame system 46 is preferably made of a light weight and corrosion resistant material, including but not limited to tubing, cables, and/or angled iron or aluminum, or combinations of the same or any other suitable material. Frame 46 can be constructed of any material capable of supporting and positioning leading drive 42, trailing drive 44, dome 12, lower housing 18, flotation device 14, and the other system components of aerator device 10. Lifting eye 32 is securely affixed to frame system 46.

Vane 54 is a variable flow control device that can be mounted on intake 21 or discharge 23 of lower housing 18. Vane 54 is preferably made of a corrosion resistant material. A plurality of vanes 54 preferably enable control of the flow of liquid into and out of lower housing 18, thereby maximizing the transfer of gas to the liquid. The positioning of plurality of vane 54 can preferably be set by an operator or controlled by controller 30.

Figure 4A:
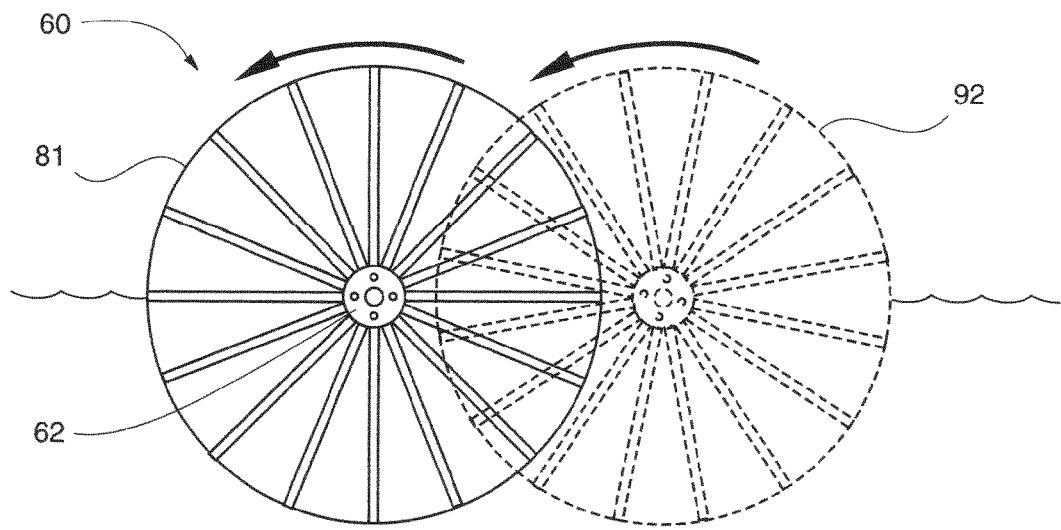
FIG. 4A is front sectional view of a pair of discs showing their direction of rotation according to the invention.

Referring now to FIG. 4A, a front view of a preferred disc 60 is shown. Disc 60 is preferably a thin flat disc made of corrosion resistant material. Disc 60 can be constructed of any material, configuration and/or dimension capable of being rotated through the sludge of wastewater. Possible shapes and configurations include, without limitation, a star, square, hexagon, octagon, and any other configurations capable of defining a mixing area and a shear force zone within a liquid medium. Disc 60 preferably has keyed hub 62 at its center for affixing disc 60 to shaft 45 (shown in FIG. 4B). Although keyed hub 62 is preferred, any suitable affixing means could be utilized of any standard design with a means to attach disc 60 to a shaft 45. The preferred keyed hub 62 allows for disc spacing and adjustment on shaft 45, thereby maintaining proper spacing.

Figure 3:
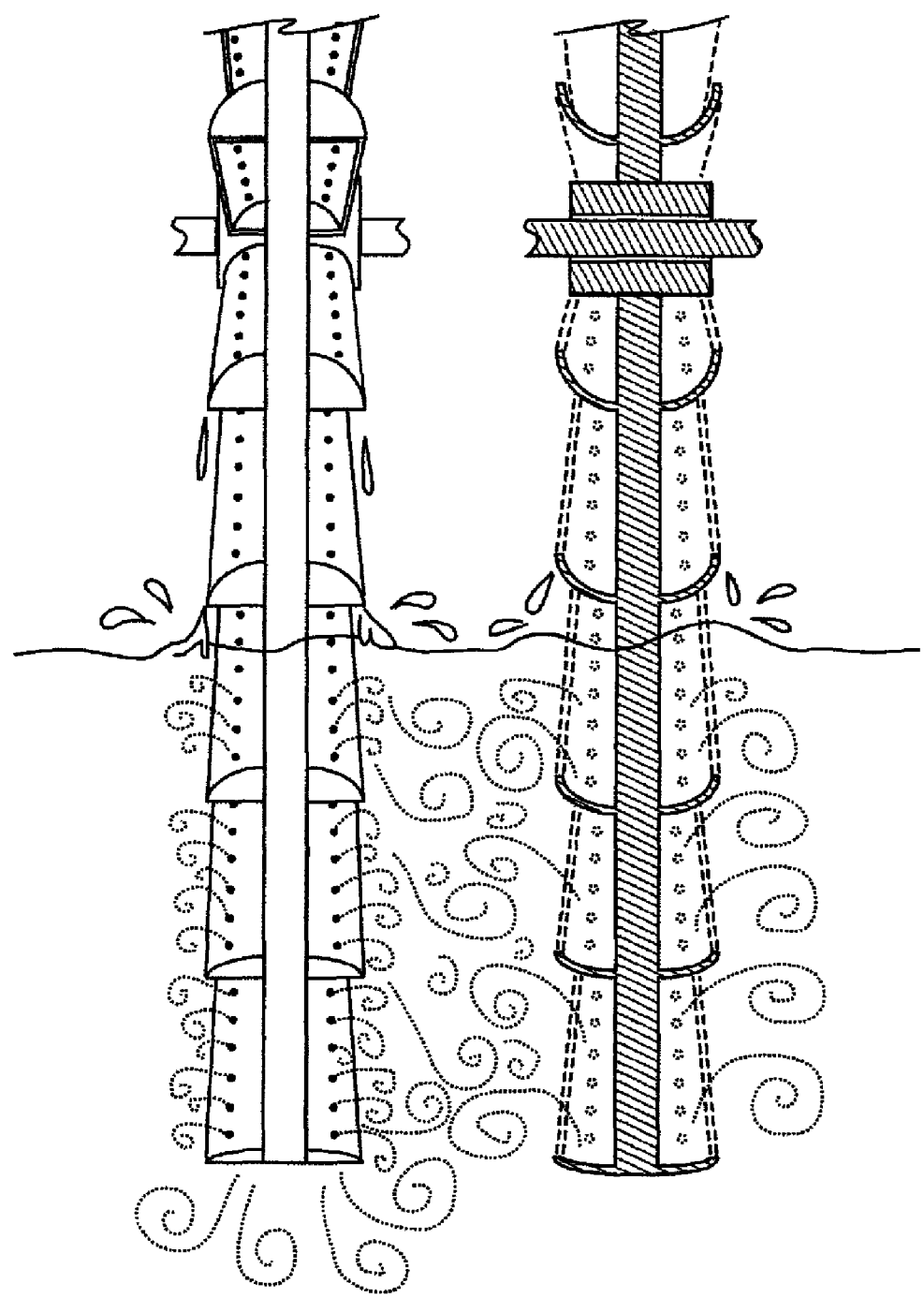
FIG. 3 is perspective view of a strake with bleed holes according to the invention.

Referring now to FIG. 3, a perspective view of preferred strake 70 is shown. Strake 70 is preferably made of a water-tight and corrosion resistant material; however, strake 70 can be constructed of any material capable of carrying liquid and/or gas. Strake 70 preferably has quarter circle, unshaped or generally triangular shaped end cap 72, open leading face 74, trailing face 75 and mounting face 76, wherein faces 74, 75, 76 preferably extend lengthwise along strake 70 forming peripheral edges of a channel for strake 70 to carry liquid and/or gas. Additionally, strake 70 preferably has a plurality of bleed holes 78 defined through trailing face 75.

Strake 70 can be varied in size, shape, angle, and bleed hole placement to maximize aerator device 10 dissolved gas transfer rate in any liquid medium. For example, a smaller strake moving at a higher speed may be more effective on wastewater with high solids content, whereas a large strake at lower speeds may be more effective on wastewater with smaller solids and also may be less disturbing to marine life. Furthermore, strake 70 can be varied in size, shape, angle, and bleed hole placement to account for the centrifugal force on the liquid. A plurality of strakes 70 are preferably secured to both sides of disc 60 in a radial configuration with each open face 74 oriented in same direction. Each strake 70 is arranged in a radial configuration beginning at the center of disc 60 and extending outward to the outer circumference edge or peripheral edge of disc 60, wherein flat face 76 of strake 70 is preferably affixed to disc 60, preferably via corrosion resistant bolt and nut (not shown). Although corrosion resistant bolt and nut are preferred, the affixing means can of any standard mechanism, and may be selected dependent on the material used for disc 60 and strake 70, including but not limited to welding, adhesive, or epoxy. The illustration shown in FIG. 3 is not a specification or limitation on the number of strakes 70 affixed to disc 60.

Figure 5:
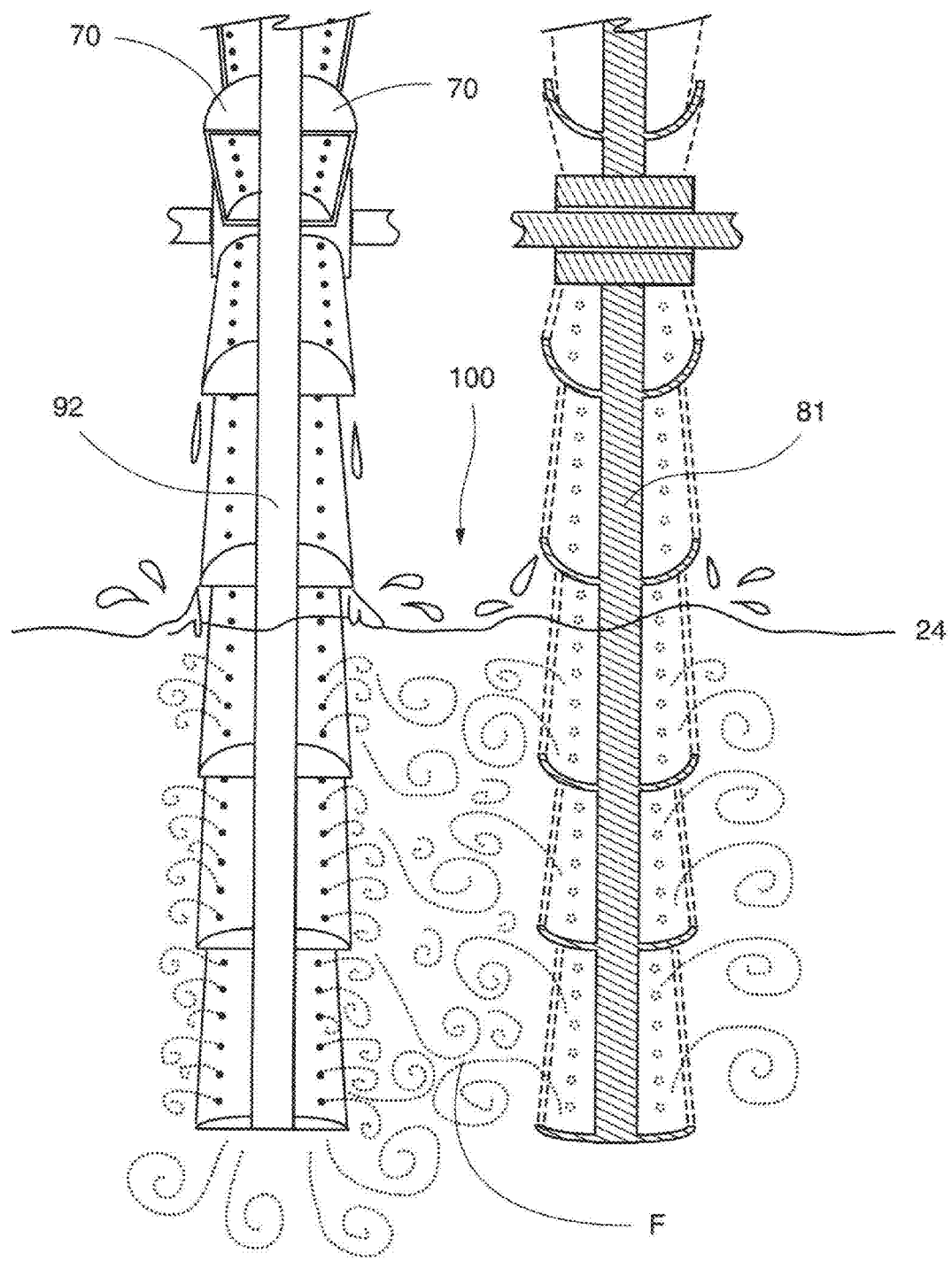
FIG. 5 is an enlarged partial sectional view depicting the dynamics of the liquid gas mixing area, showing radial strakes and bleed holes according to the preferred embodiment of the present invention.

Referring now to FIG. 4A, a front sectional view of a pair of preferred discs 60 is shown, depicting the preferred arrangement, area of overlap, and direction of rotation. Leading disc 81 and trailing disc 92 are preferably arranged so they overlap as discussed below. Both disc assemblies are preferably partially submerged in a liquid medium, preferably at a depth of at least 40% of their diameter; however, both disc assemblies can be submerged in a liquid medium to any depth, wherein at least part of the disc assemblies are exposed to the atmosphere under dome 12. Mixing area 100 is created below liquid line 24 between where the leading disc 81 and trailing disc 92 overlap as also depicted in FIG. 5. The plurality of strakes 70 on leading disc 81 capture liquid from the wastewater pond and carry it up into mixing area 100. Plurality of strakes 70 on trailing disc 92 preferably capture air underneath dome 12 and carry it down into mixing area 100.

As depicted in FIG. 4A, when strake 70 is rotated up out of the liquid, it carries liquid up and out of the wastewater pond. This carried liquid escapes through bleed holes 78, thereby creating additional liquid surface area which comes into contact with air, thereby resulting in an additional transfer of gas to the liquid. When strake 70 is rotated down into the liquid, it carries air down into the wastewater pond. The air escapes through a plurality bleed holes 78, thereby creating additional submerged air which comes into contact with liquid, resulting in additional transfer of gas to the liquid.

Figure 4B:
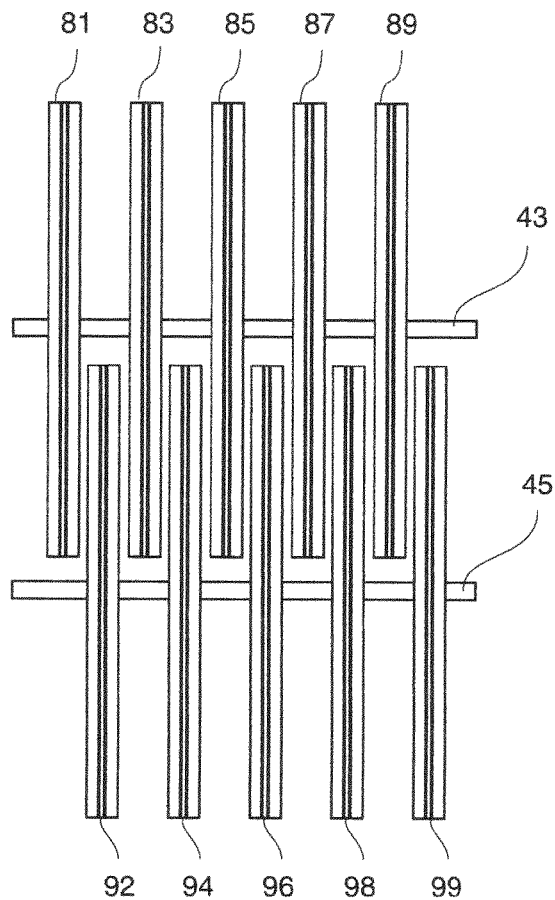
FIG. 4B is a top sectional view of disc array showing two sets of discs interleaved amongst each other according to the invention.

Referring now to FIG. 4B, a top sectional view of two sets of plurality of discs 60 intermeshed amongst each other are shown. Leading drive 42 is connected to leading shaft 43 and one or more disc 60 (shown as leading disc assemblies 81, 83, 85, and 87) are preferably affixed to leading shaft 43. Trailing drive 44 is connected to trailing shaft 45 and one or more disc 60 (shown as trailing disc assemblies 92, 94, 96, 98, and 99) are preferably affixed to trailing shaft 45. The illustration shown in FIG. 4B is not a specification or limitation on the number of discs 60 in either array of discs or the number of shafts or the number of drives. These variable parameters are determined by the dissolved gas requirements and other application requirements of the liquid being treated. The leading and trailing disc assemblies are placed in parallel, with their properly spaced discs placed in an overlapping, interlaced relation. Spacing between the discs 60 is preferably accomplished using keyed hub 62; however, spacers (not shown) can be used. Preferably, the overlap between leading and trailing disc assemblies is 45% of the diameter of disc 60; however, the amount of overlap between the two sets of discs may be adjusted by varying the parallel spacing of leading shaft 43 and trailing shaft 45 provided the distance is less than the disc 70 radius.

Referring now to FIG. 5, an enlarged partial sectional view of aerator device 10 is shown, to facilitate explanation of the dynamics of mixing area 100. Strakes 70 on leading disc 81 captures liquid from the wastewater pond and carries it up into the mixing area 100. Strakes 70 on trailing disc 92 captures air from underneath dome 12 and carries it down into mixing area 100, in addition to pushing liquid down into mixing area 100. Discs 81 and 92 and their two strakes 70 moving in unison together create shear force F between the upward and downward moving liquid within the mixing area, resulting in shear force F that drives air into the oxygen depleted wastewater. Shearing force F occurs in oxygen rich mixing area 100 resulting in an increased transfer of oxygen into the wastewater.

Referring now to FIG. 5, an enlarged partial sectional view of aerator device 10 is shown, to facilitate further explanation of additional dynamics of liquid gas mixing area 100. Strakes 70 on the leading disc 81 captures liquid from the wastewater pond and carries it up into mixing area 100. Plurality of bleed holes 78 in trailing face 75 of strake 70 on leading disc 81 will leak liquid into mixing area 100 as fluid eddies. Strake 70 on the trailing disc 92 captures air from underneath dome 12 and carries it down into mixing area 100. Plurality of bleed holes 78 in trailing face 75 of the strakes on trailing disc 90 leak flurries of air bubbles into mixing area 100. The flurry of air bubbles and fluid eddies combine in mixing area 100, thereby creating an increased transfer of oxygen into the wastewater.

The disc assemblies can be set in motion rotating in unison, or, the individual drive speeds can be utilized, thereby allowing for essentially infinite combinations of liquid and air, shearing forces, liquid eddies, and/or flurries of bubbles, thus allowing for optimum transfer of oxygen into the wastewater.

It is contemplated in an alternate embodiment that aerator device 10 is suitable for utilization and adaptable without flotation device 14 for use in a pipe, such as a discharge pipe. Furthermore, it is contemplated in an alternate embodiment that aerator device 10 is adaptable without lower housing 18 for use in a pipe, such as a discharge pipe. Aerator device 10 is preferably mechanically affixed and positioned inside the pipe. Preferably, the flow rate of the liquid in the pipe is adjusted to maintain the liquid level where both disc assemblies are preferably partially submerged in a liquid medium, preferably at a depth of at least 40% of their diameter; however, both disc assemblies can be submerged in a liquid medium to any depth, wherein at least part of the disc assemblies are exposed to the atmosphere under dome 12.

Figure 6:
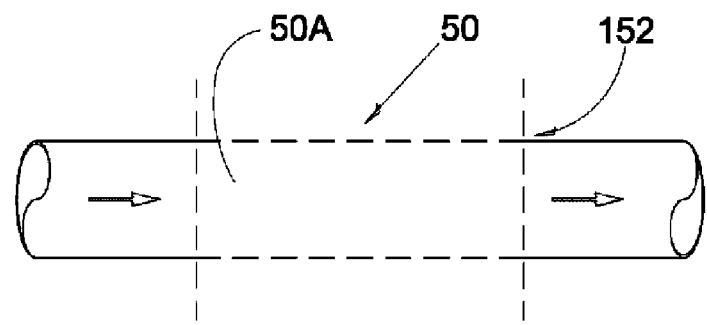
FIG. 6 is a side view of a standard industrial waste water or discharge pipe.
Figure 7:
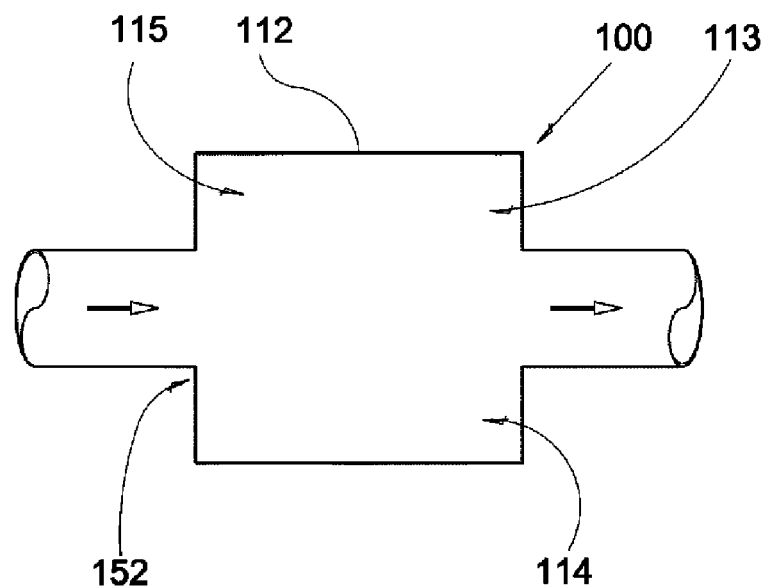
FIG. 7 is a side view of the pipe in FIG. 6 with a section cut out of the pipe and a compartmental enclosure fit between the ends of the pipe.

Referring now to FIG. 6, a standard industrial waste water or discharge pipe 50 is shown. Referring now to FIG. 7, wherein discharge pipe 50 is shown with section 50A removed from discharge pipe 50 and replaced with sealed enclosure 112. Preferably, enclosure 112 is inserted into the space where section 50A was removed so as to define a space or compartment 115 for containing mechanical agitation of aerator device 100. Enclosure 112 preferably is welded to discharge pipe's 50 ends 152, which remained after cutting or removing section 50A from pipe 50. It is contemplated that enclosure 112 is preferably constructed of an airtight and corrosion resistant material such as fiberglass, metal or the like. That is, enclosure 112 may be constructed of any material capable of holding the area defined by space or compartmental enclosure 115 sealed at a selected, preferably increased barometric pressure. It is recognized that other suitable materials could be utilized without departing from the intended scope of the present invention. Moreover, enclosure 112 may be affixed to discharge pipe's 50 ends 152 utilizing epoxy, nuts and bolts compressing a seal or sealant or other means known to one of ordinary skill in the art. Enclosure 112 is further divided into upper section 113 of compartment 115, which creates a space above waterline 124 and lower section 114 of compartment 115, which creates a space below waterline 124 that contains the liquid medium flowing through discharge pipe 50 and enclosure 112. Similar to FIG. 1, upper section 113 of compartment 115 creates a space above waterline 124 that can collect foam and odor generated by aerator device 100. Foam generated by aerator device 100 is thus held in close proximity to aerator device 100 and must travel back beneath waterline 124 to escape upper section 113 of compartment 115, further enhancing the transfer of gas to the liquid. Odorous gases generated by the mechanical agitation of aerator device 100 are also trapped in upper section 113 of compartment 115 preventing their escape into the surrounding environment resulting in an essentially odor free operation. In addition, upper section 113 of compartment 115 acts as a sound barrier, trapping the noises generated by the mechanical agitation of aerator device 100, preventing their escape into the surrounding environment, and thereby resulting in an essentially noiseless operation.

Figure 8:
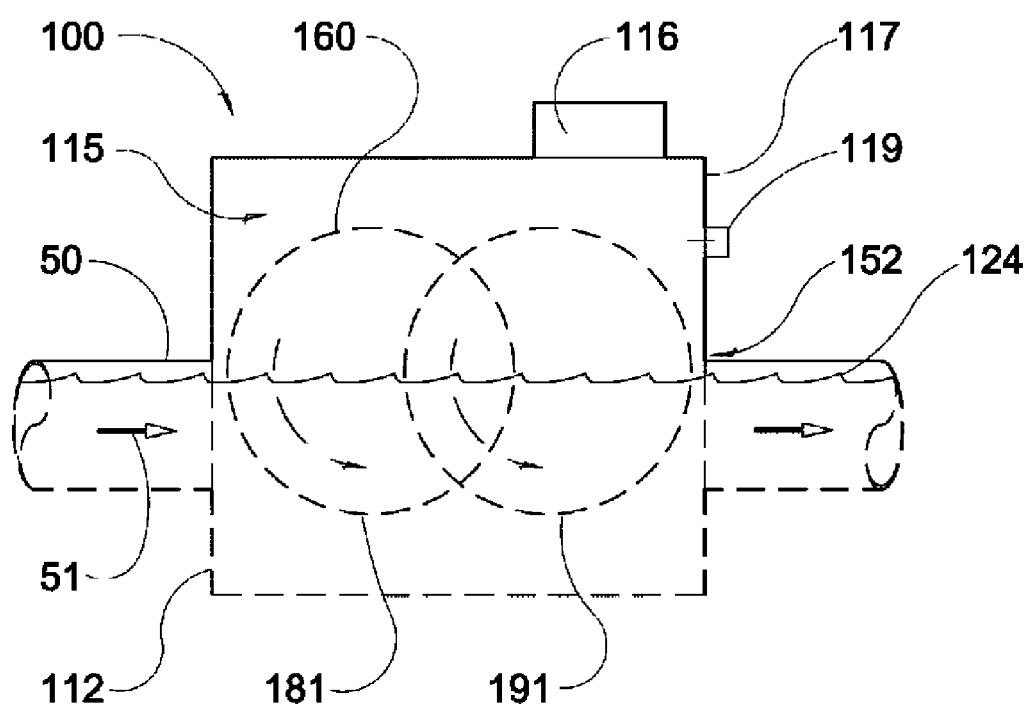
FIG. 8 is a side view of the pipe and enclosure in FIG. 7 with an aeration device housed in the enclosure.

Referring now to FIG. 8 is illustrated an alternate embodiment of a fully enclosed in pipe aerator device 100. Aerator device 100 is a mechanical gas dissolving apparatus operating in a controlled pressurized environment of a discharge pipe 50. In pipe aerator device 100 operates similar to aerator device 10 of FIGS. 1-5; however, in-line pipe aerator device 100 does not include dome 12, flotation device 14, and lower housing 18. As in FIGS. 1-5 in pipe aerator device 100 includes discs 160 each having strakes 70 as shown in FIGS. 3-5 operating as described in FIGS. 1-5 above functioning to transfer gas to liquid, especially for increasing the concentration of dissolve oxygen in the liquid medium of pipe 50.

Blower 116 is preferably any common industrial variable speed rotary type blower similar to blower 16 of FIG. 1. Blower 116 can be of any standard design with air flow and pressure ratings capable of increasing the barometric pressure of the air in compartment 115 to preferably between approximately 35-40 inches of mercury or 1-3 psi, however, greater barometric pressure can be utilized depending on the gas and liquid medium being mixed. Blower 116 is preferably a single unit positioned proximate upper section 117 of enclosure 112; however, blower 116 can be in the form of a single or multiple blowers and can be located anywhere on in-line aerator device 100 that permits air flow access to interior compartment 115 of enclosure 112. In addition, blower 116 may be remotely positioned relative to compartment 115 of enclosure 112 and pressurized air from blower 116 may be piped or tubed from blower 116 to compartment 115 of enclosure 112. In the preferred operation, blower 116 increases the barometric pressure in compartment 115 of enclosure 112 creating an ideal environment for the transfer of gas to the liquid in compartment 115 of enclosure 112, wherein coincidentally surface area is increased via agitation and whirling of liquid by aerator device 100. In addition, the increase in barometric pressure under in compartment 115 of enclosure 112 assists with popping the foam bubbles, effectively reducing the foam generated by aerator device 100.

Blower 116 can preferably be used for facilitating fine adjustment of waterline 124 in compartment 115 of enclosure 112 by increasing or decreasing the barometric pressure of the air in compartment 115, thus maintaining the waterline 124 at a predetermined position relative to discs 160. By increasing the air pressure in compartment 115 of enclosure 112, blower 116 causes waterline 124 to lower forcing the liquid medium out of enclosure 112 and into pipe 50. In contrast, by reducing the air pressure in compartment 115 of enclosure 112 blower 116 causes waterline 124 to rise allowing the liquid medium to enter enclosure 112 from pipe 50. Moreover, blower 116 with feedback from sensor 119 allows for user-controlled or controller controlled height adjustment of waterline 124 in compartment 115 of enclosure 112 in relation to discs 160 optimizing dissolve gas in the liquid medium of pipe 50.

Sensor 119 preferably represents one or more sensors, including but not limited to sensors to detect water level, gas pressure, the amount of dissolved gas in the liquid medium, and humidity inside compartment 115 of enclosure 112 and to provide a representative signal of such information for feed back to a controller, user, or directly to blower 116. Various means of sensing and types of sensors to detect water level, gas pressure, the amount of dissolved gas in the liquid medium, and humidity are known to one of ordinary skill in the art and are contemplated herein.

Figure 9:
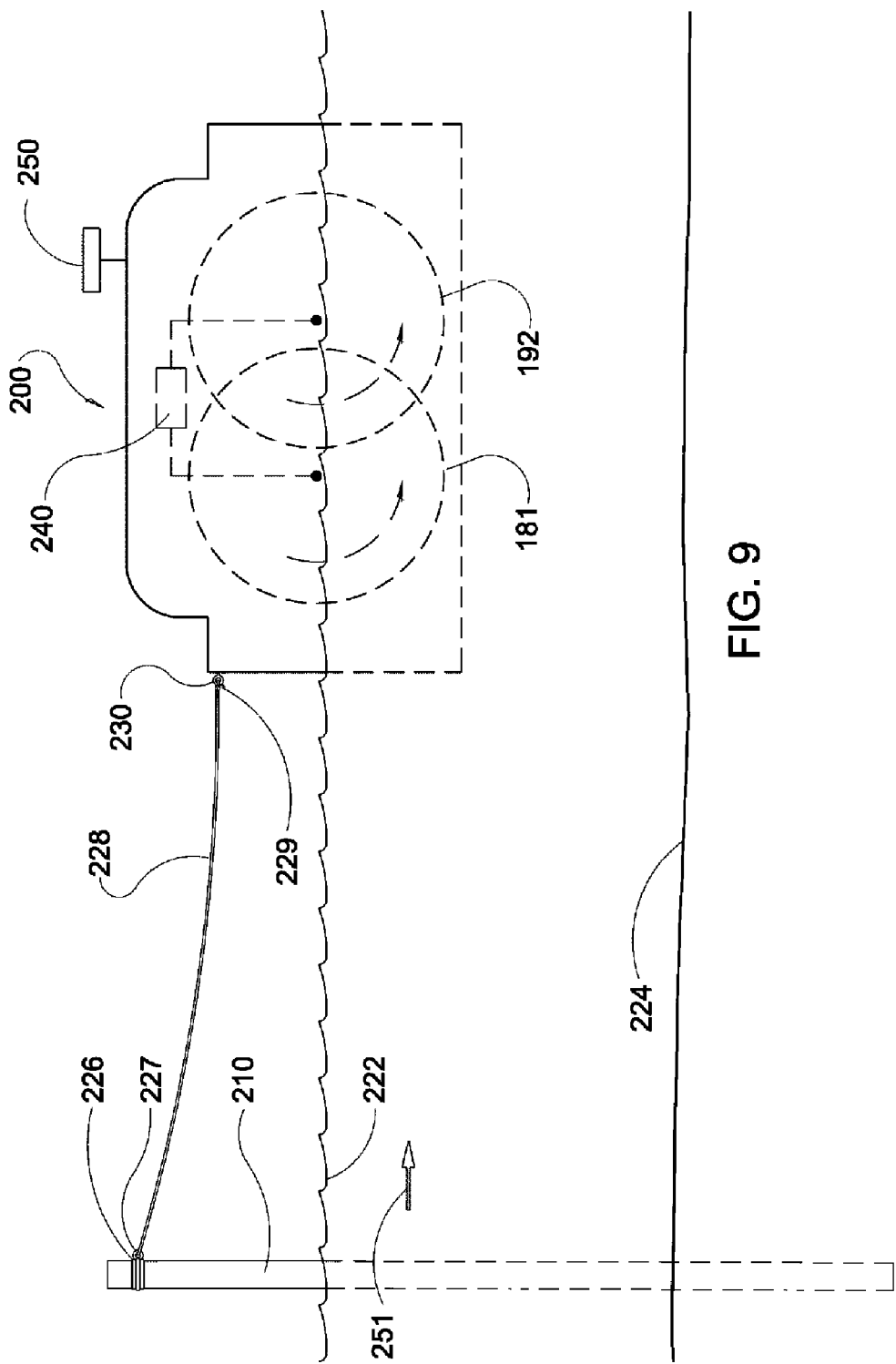
FIG. 9 is a side view of a tethered aeration apparatus of FIG. 1.

Referring now to FIG. 9, illustrates an alternate embodiment of a tethered aeration apparatus 200 of FIG. 1. Anchor device 210 is permanently affixed to river or tidal bed 224 and extends above waterline 222 to provide stationary anchor support for tethered aeration apparatus 200. It is contemplated herein that anchor device 210 may be any device capable of securing tethered aeration apparatus 200 in a moving liquid medium such as river flow, tidal movements and the like, including but not limited to buoys. Swivel attachment 226 provides an anchor point for one end 227 of cable 228 to affix to anchor device 210 and the other end 229 of cable 228 is affixed to eye 132 anchoring tethered aeration apparatus 200 relative to anchor device 210, thus pulling tethered aeration apparatus 200 through liquid medium shown travelling in the direction of arrows 251. As river current shift or tidal waters alter direction tethered aeration apparatus 200 preferably shifts positions down stream from anchor device 210 continuing to scoop flowing liquid medium into open end 21, referenced as the intake 21 shown in FIG. 1.

Tethered aeration apparatus 200 operates similar to aerator device 10 of FIGS. 1-5. As in FIGS. 1-5 tethered aeration apparatus 200 includes discs 160 each having strakes 70 as shown in FIGS. 3-5 operating as described in FIGS. 1-5 above functioning to transfer gas to liquid, especially for increasing the concentration of dissolve oxygen in the liquid medium.

It is contemplated herein that tethered aeration apparatus 200 may be moved or tugged (tug boat) to different locations and re-anchored depending on river flow, tidal conditions and/or gas to liquid transfer requirements, especially to achieve dissolve oxygen levels in the liquid medium of interest.

Recumbent generator 240 is shown in this embodiment of the tethered aeration apparatus 200, but may be utilized in the in-pipe aerator device 100 as well. Preferably, liquid medium flows past leading disc 181 forcing leading disc 181 to turn in the direction of liquid medium shown travelling in the direction of arrows 251 (FIG. 9) or arrow 51 (FIG. 8). Likewise, liquid medium flows past trailing disc 192 forcing trailing disc 192 to turn in the direction of liquid medium shown travelling in the direction of arrows 251 (FIG. 9) or arrow 51 (FIG. 8). Preferably recumbent generator 240 generates power from one or both leading disc 181 and/or trailing disc 192 rotations and utilizes the electric power generated by recumbent generator 240 to compensate for any lag occurring in either leading disc 181 and/or trailing disc 192 by powering drive 28 with electric power generated by recumbent generator 240, thus enabling synchronized or un-synchronized rotation of discs 60.

Land based power may be supplied to tethered aeration apparatus 200 along cable 228 or locally generated power may be generated by energy device 250. Energy generation device 250 may include, but is not limited to solar, wind, static electricity, photovoltaic, electric generator and/or storage batteries.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus for treating liquid by exposing the liquid to gas, the apparatus comprising:
   a) a pipe having an enclosure positioned in-line with said pipe, wherein a sealed space is defined in said enclosure;
   b) an aeration means positioned within said sealed space and partially submerged in the liquid medium flowing from said pipe and said enclosure, wherein said aeration means comprises one or more parallel shafts, at least one first disc positioned axially on one of said shafts, at least one second disc positioned axially on another of said shafts, wherein said second disc is interleaved relative to said first disc, and wherein a surface of said first disc rotates in a direction opposite a surface of said second disc relative to each other resulting in a mixing area therebetween; and
   c) at least one blower, said blower disposed in a position enabling an effect therefrom on the barometric pressure in said sealed space.

2. The apparatus of claim 1, wherein said first and said second discs drive gas into the liquid increasing the dissolved gas in the liquid.

3. The apparatus of claim 1, further comprising a plurality of discs, said plurality of discs further comprising a leading disc and a trailing disc.

4. The apparatus of claim 1, further comprising at least one variable speed drive for rotating said shafts.

5. The apparatus of claim 1, further comprising at least one strake carried by said first disc, each of said at least one strake defining a channel with end caps, and at least one strake carried by said second disc.

6. The apparatus of claim 5, wherein said at least one strake is radially disposed.

7. The apparatus of claim 5, further comprising a plurality of bleed holes, said bleed holes defined in a trailing face of each said strake.

8. The apparatus of claim 1, wherein said blower creates a variable barometric pressure in said sealed space.

9. The apparatus of claim 4, further comprising a controller, said controller adapted to control said drive speed.

10. The apparatus of claim 9, wherein said controller has wireless controls.

11. The apparatus of claim 1, further comprising at least one sensor.

12. The apparatus of claim 11, wherein said sensor measurement is selected from the group consisting of dissolved oxygen, waterline height, gas pressure, dissolved gas in the liquid medium, or humidity.

13. The apparatus of claim 1, wherein said first disc carries the gas into said mixing area and said second disc carries liquid into said mixing area producing a shear force between the gas and the liquid increasing the dissolved gas in the liquid.

14. The apparatus of claim 5, wherein said strake on said first disc carries gas down into said mixing area and said strake on said second disc carries liquid up into said mixing area producing a shear force between the gas and the liquid increasing the dissolved gas in the liquid.

15. The apparatus of claim 8, wherein a decrease in said barometric pressure raises the waterline in said sealed space.

16. The apparatus of claim 8, wherein an increase in said barometric pressure pops air bubbles created by said aeration means within said sealed space resulting in reduced foam.

17. The apparatus of claim 8, wherein an increase in said barometric pressure lowers the waterline in said sealed space.

18. The apparatus of claim 8, wherein an increase in said barometric pressure enhances contact between said gas and said liquid within said sealed space.

19. The apparatus of claim 4, wherein said variable speed drives for rotating said shafts operate at different speeds.

20. The apparatus of claim 4, further comprising a recombinant generator, said generator adapted to assist at least one variable speed drive.

21. The apparatus of claim 4, further comprising an energy generation device, said energy generation device adapted to provide local power for said apparatus.

\* \* \* \* \*